(12) United States Patent  
Watanabe et al.

(10) Patent No.: US 9,937,384 B2  
(45) Date of Patent: Apr. 10, 2018

(54) MULTI-PIECE SOLID GOLF BALL

(71) Applicant: Bridgestone Sports Co., Ltd., Tokyo (JP)

(72) Inventors: Hideo Watanabe, Chichibushi (JP); Atsuki Kasashima, Chichibushi (JP); Tsuyoshi Nakajima, Chichibushi (JP); Takanori Tago, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 44 days.

(21) Appl. No.: 15/047,758

(22) Filed: Feb. 19, 2016

(65) Prior Publication Data  
US 2016/0279484 A1 Sep. 29, 2016

(30) Foreign Application Priority Data  
Mar. 24, 2015 (JP) ................... 2015-061054

(51) Int. Cl.  
*A63B 37/00* (2006.01)  
*C08L 23/08* (2006.01)  
(Continued)

(52) U.S. Cl.  
CPC ...... *A63B 37/0092* (2013.01); *A63B 37/0039* (2013.01); *A63B 37/0076* (2013.01);  
(Continued)

(58) Field of Classification Search  
CPC ............ A63B 37/0063; A63B 37/0076; A63B 37/0092  
(Continued)

(56) References Cited

U.S. PATENT DOCUMENTS 6,117,025 A * 9/2000 Sullivan ............ A63B 37/0003  
473/373  
6,251,031 B1 6/2001 Hayashi et al.  
(Continued)

FOREIGN PATENT DOCUMENTS

GB 2 340 762 B 12/2002  
GB 2 340 763 B 1/2003  
(Continued)

*Primary Examiner* — Raeann Gorden  
(74) *Attorney, Agent, or Firm* — Sughrue Mion, PLLC

(57) ABSTRACT

In a golf ball having, in order, a core, an envelope layer, an intermediate layer and a cover, the following conditions are satisfied:
(I) ball surface hardness>intermediate layer surface hardness>envelope layer surface hardness<core surface hardness,
(II) (Shore D hardness at core surface−Shore D hardness at envelope layer surface)≥10,
(III) (cover thickness−intermediate layer thickness)>0.05 mm,
(IV) (intermediate layer thickness−envelope layer thickness)>0.05 mm, and
(V) $(Cs-C_{10})/(C_{10}-Cc)>1.0$ (where Cs denotes the JIS-C hardness at the core surface, $C_{10}$ the JIS-C hardness at a position 10 mm from a center of the core, and Cc the JIS-C hardness at the core center).

The ball provides an excellent flight performance when struck by the average golfer, a feel that is both soft and solid, and an excellent durability to repeated impact.

19 Claims, 1 Drawing Sheet

(51) Int. Cl.
*C08L 23/22* (2006.01)
*C08K 5/20* (2006.01)

(52) U.S. Cl.
CPC ........... *C08L 23/0876* (2013.01); *C08L 23/22* (2013.01); *A63B 37/0033* (2013.01); *A63B 37/0045* (2013.01); *A63B 37/0048* (2013.01); *A63B 37/0062* (2013.01); *A63B 37/0063* (2013.01); *A63B 37/0096* (2013.01); *C08K 5/20* (2013.01)

(58) Field of Classification Search
USPC ......................................................... 473/376
See application file for complete search history.

(56) References Cited

U.S. PATENT DOCUMENTS

| | | |
|---|---|---|
| 6,666,780 B2 | 12/2003 | Watanabe |
| 6,743,122 B2 | 6/2004 | Hayashi et al. |
| 8,414,425 B2 | 4/2013 | Kasashima et al. |
| 9,011,273 B2 | 4/2015 | Watanabe et al. |
| 2013/0172111 A1* | 7/2013 | Sakamine ........... A63B 37/0051 473/372 |
| 2014/0194221 A1* | 7/2014 | Watanabe .......... A63B 37/0092 473/373 |

FOREIGN PATENT DOCUMENTS

| | | |
|---|---|---|
| JP | 2000-60997 A | 2/2000 |
| JP | 2000-61000 A | 2/2000 |
| JP | 2000-61001 A | 2/2000 |
| JP | 2000-61002 A | 2/2000 |
| JP | 2002-764 A | 1/2002 |
| JP | 2011-92708 A | 5/2011 |
| JP | 2014-132955 A | 7/2014 |

* cited by examiner

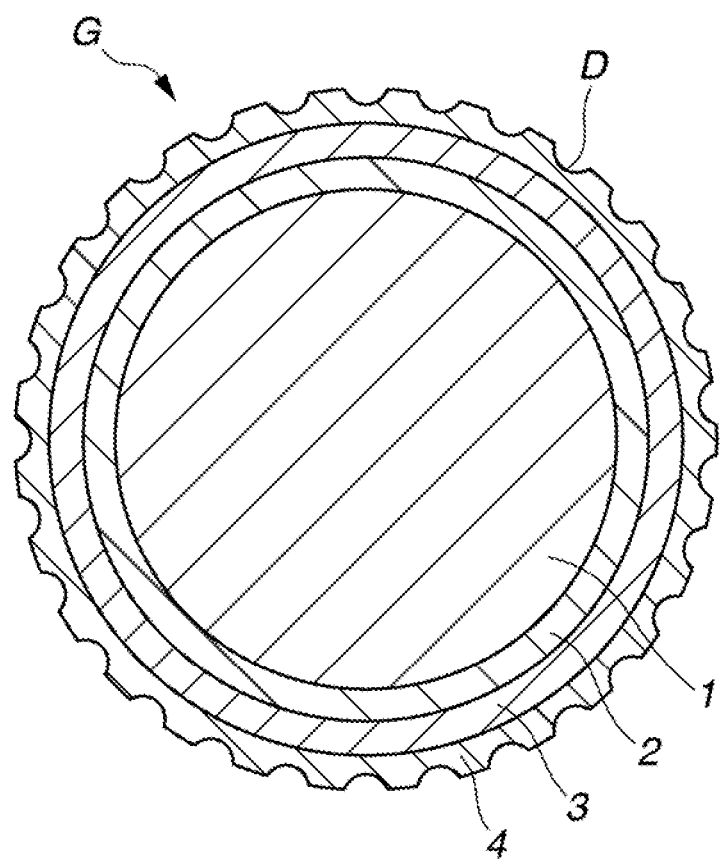

MULTI-PIECE SOLID GOLF BALL

CROSS-REFERENCE TO RELATED APPLICATION

This non-provisional application claims priority under 35 U.S.C. § 119(a) on patent application No. 2015-061054 filed in Japan on Mar. 24, 2015, the entire contents of which are hereby incorporated by reference.

TECHNICAL FIELD

The present invention relates to a golf ball having a multi-piece construction which, when played by golfers whose head speeds are not fast, enables a good distance to be achieved and provides a feel that is both soft and solid.

BACKGROUND ART

Numerous design innovations have hitherto been introduced into the multilayer construction of golf balls, and many balls have been developed to satisfy the needs of not only professional golfers and skilled amateurs, but also amateur golfers having mid or low head speeds.

Such golf balls are described in, for example, JP-A 2011-092708, JP-A 2000-61001, JP-A 2000-61000, JP-A 2002-764, JP-A 2000-61002, JP-A 2000-60997 and JP-A 2014-132955.

However, further improvement in terms of increased distance is expected even of these golf balls. Also, among golfers whose head speed is not very fast, even when it has been possible to maintain a good distance on shots with a driver (W#1), the feel and durability of the ball often leave something to be desired. The "feel" of a golf ball refers to the kinesthetic sensation experienced by a player at the moment of impact when striking the ball with a golf club. In this invention, the feel is considered to be good when it is both soft and solid at the same time, the word "solid" indicating a sense that the ball will travel far. Accordingly, there exists a desire for a golf ball which enables even amateur golfers to fully achieve both a good feel and a good distance.

SUMMARY OF THE INVENTION

It is therefore an object of this invention to provide a golf ball which, when played by a golfer whose head speed is not fast, enables a good distance to be achieved and provides a feel that is both soft and solid.

As a result of extensive investigations, we have discovered that, in a multi-piece solid golf ball having a core, an envelope layer encasing the core, an intermediate layer encasing the envelope layer, and a cover encasing the intermediate layer, by optimizing the hardness relationship among the respective layers—that is, the relationship between the ball surface hardness, intermediate layer surface hardness, envelope layer surface hardness and core surface hardness, optimizing the thickness relationship between the cover thickness, intermediate layer thickness and envelope layer thickness, and optimizing the hardness relationship at the core interior from the surface to the center of the core, it is possible for the ball, when played by amateur golfers whose head speed is not fast, to impart a soft feel on full shots and to have a further reduced spin rate, providing an excellent flight performance. Such a golf ball also has an excellent durability on repeated impact.

Accordingly, the invention provides a multi-piece solid golf ball having a core, an envelope layer encasing the core, an intermediate layer encasing the envelope layer, and a cover encasing the intermediate layer, wherein the following conditions are satisfied:

(I) ball surface hardness>intermediate layer surface hardness>envelope layer surface hardness<core surface hardness, (II) (Shore D hardness at core surface−Shore D hardness at envelope layer surface)≥10, (III) (cover thickness−intermediate layer thickness)>0.05 mm, (IV) (intermediate layer thickness−envelope layer thickness)>0.05 mm, and (V) $(Cs-C_{10})/(C_{10}-Cc)>1.0$.

Here, Cs in condition (V) denotes the JIS-C hardness at the core surface, $C_{10}$ denotes the JIS-C hardness at a position 10 mm from a center of the core, and Cc denotes the JIS-C hardness at the core center.

In a preferred embodiment, the golf ball of the invention further satisfies the following condition:

(VI) (JIS-C hardness at core surface−JIS-C hardness at core center)≥21.

In another preferred embodiment, the inventive golf ball has a core diameter in the range of 35.3 to 37.3 mm and further satisfies the following condition:

(VII) 2.7 mm≤(cover thickness+intermediate layer thickness+envelope layer thickness)≤3.7 mm.

In still another preferred embodiment, the golf ball further satisfies the following condition:

(VIII) 10≤(Shore D hardness at intermediate layer surface−Shore D hardness at envelope layer surface)≤50.

In yet another preferred embodiment, the golf ball further satisfies the following condition (IX):

(IX) 5≤(Shore D hardness at ball surface−Shore D hardness at intermediate layer surface)≤20.

In a still further embodiment, the golf ball further satisfies the following condition (X):

(X) specific gravity of cover≥specific gravity of intermediate layer.

The envelope layer of the inventive golf ball is preferably formed of a resin material composed primarily of a thermoplastic polyether ester elastomer.

The core of the inventive golf ball is preferably formed of a material molded under heat from a rubber composition comprising: (A) a base rubber, (B) an organic peroxide, and (C) water and/or a metal monocarboxylate.

In the golf ball of the invention, letting $\tan \delta_1$ be the loss tangent at a dynamic strain of 1% and $\tan \delta_{10}$ be the loss tangent at a dynamic strain of 10% when the loss tangents of the core center and the core surface are measured at a temperature of −12° C. and a frequency of 15 Hz, and defining the tan δ slope as $(\tan \delta_{10}-\tan \delta_1)/(10\%-1\%)$, the difference between the tan δ slope at the core surface and the tan δ slope at the core center is preferably larger than 0.002.

The golf ball of the invention preferably satisfies the condition $V_0-V_{60}<0.7$, where $V_0$ is the initial velocity of the core in the golf ball after the envelope layer, intermediate layer and cover, collectively referred to herein as "the core-covering layers," have been molded, as measured after peeling away the core-covering layers, and $V_{60}$ is the core initial velocity measured 60 days after measuring $V_0$.

In the inventive golf ball, the intermediate layer is preferably formed of a resin composition comprising: a combined amount of 100 parts by weight of the following two base resins O and P:

(O) an olefin-unsaturated carboxylic acid-unsaturated carboxylic acid ester ternary copolymer, or a metal neutralization product thereof, having a weight-average molecular weight (Mw) of at least 140,000, an acid content of from 10 to 15 wt % and an ester content of at least 15 wt %, and (P) an olefin-acrylic acid binary random copolymer, or a metal neutralization product thereof, having a weight-average molecular weight (Mw) of at least 140,000 and an acid content of from 10 to 15 wt % blended in a weight ratio (O):(P) of from 90:10 to 10:90;

(Q) from 1.0 to 2.5 parts by weight of a basic inorganic metal compound capable of neutralizing un-neutralized acid groups in the resin composition; and (R) from 1 to 100 parts by weight of an anionic surfactant having a molecular weight of from 140 to 1500. In this embodiment, the component (O) and (P) resins each have a melt flow rate of from 0.5 to 20 g/10 min, component (O) and component (P) have a melt flow rate difference therebetween of not more than 15 g/10 min, the composition of components (O) to (R) has a melt flow rate of at least 1.0 g/10 min, and a molded material obtained by molding the composition under applied heat has a Shore D hardness of from 35 to 60.

Advantageous Effects of the Invention

The golf ball of the invention provides an excellent flight performance when struck by the average golfer, has a feel that is both soft and solid, and is endowed with an excellent durability on repeated impact.

BRIEF DESCRIPTION OF THE DIAGRAMS

FIG. 1 is a schematic sectional diagram of a multi-piece solid golf ball according to an embodiment of the invention.

DESCRIPTION OF THE PREFERRED EMBODIMENTS

The objects, features and advantages of the invention will become more apparent from the following detailed description, taken in conjunction with the foregoing diagrams.

The multi-piece solid golf ball of the invention enables golfers whose head speed is not fast to achieve a good distance on full shots such as with a driver and obtain a feel that is both soft and solid. The ball has at least three layers over the core, these being, in order: an envelope layer, an intermediate layer and a cover. The hardness relationship among these layers is optimized, in addition to which the thickness relationship among the layers has been optimally designed. Referring to FIG. 1, the golf ball G has a core 1, an envelope layer 2 encasing the core 1, an intermediate layer 3 encasing the envelope layer 2, and a cover 4 encasing the intermediate layer 3. Numerous dimples D are generally formed on the surface of the cover 3 to improve the aerodynamic properties of the ball. The respective layers are described in detail below.

The core diameter, although not particularly limited, is generally from 35.3 to 37.3 mm, preferably from 35.7 to 36.9 mm, and more preferably from 36.1 to 36.5 mm. When the core diameter is too small, the spin rate on shots with a driver (W#1) may rise, as a result of which the intended distance may not be achieved. When the core diameter is too large, the durability to cracking on repeated impact may worsen, or the feel of the ball at impact may worsen.

The core deflection (mm) when compressed under a final load of 1,275 N (130 kgf) from an initial load of 98 N (10 kgf), although not particularly limited, is preferably from 2.5 to 8.0 mm, more preferably from 3.0 to 6.0 mm, and even more preferably from 3.8 to 5.0 mm. When the core is too hard, the spin rate may rise excessively, resulting in a poor distance, and the feel of the ball may become too hard. On the other hand, when the core is too soft, the rebound may be too low, resulting in a poor distance, or the feel may become too soft and the durability to cracking on repeated impact may worsen.

The core surface hardness, expressed in terms of JIS-C hardness, is preferably from 75 to 90, more preferably from 78 to 87, and even more preferably from 80 to 85. When the core surface hardness is too low, the spin rate may rise excessively and the rebound may be low, possibly resulting in a poor distance. On the other hand, when this value is too high, the feel of the ball may be too hard or the durability to cracking on repeated impact may worsen.

The hardness at a position 10 mm from the center of the core, expressed in terms of JIS-C hardness, is preferably from 58 to 72, more preferably from 60 to 69, and even more preferably from 62 to 67. The hardness at a position 5 mm from the core center, expressed in terms of JIS-C hardness, is preferably from 53 to 67, more preferably from 55 to 64, and even more preferably from 57 to 62. When these hardness values are too low, the rebound may become lower, as a result of which the distance traveled by the ball may decrease, and the durability to cracking on repeated impact may worsen. On the other hand, when these hardness values are too high, the feel of the ball may harden or the spin rate on full shots may rise, as a result of which the intended distance may not be achieved.

The center hardness of the core, expressed in terms of JIS-C hardness, is preferably from 48 to 62, more preferably from 51 to 60, and even more preferably from 53 to 58. When this hardness value is too low, the durability to cracking on repeated impact may worsen. On the other hand, when this hardness value is too high, the spin rate may rise excessively, resulting in a less than desirable distance.

The hardness difference between the core surface and core center, expressed in terms of JIS-C hardness, is typically from 21 to 40, preferably from 23 to 36, and more preferably from 25 to 32. When the hardness difference is too small, the spin rate-lowering effect on shots with a driver (W#1) may be inadequate, and so a good distance may not be achieved. On the other hand, when the hardness difference is too large, the initial velocity on actual shots may be low, resulting in a less than desirable distance, or the durability to cracking on repeated impact may worsen.

In addition, letting Cc be the JIS-C hardness at the core center, $C_5$ be the JIS-C hardness at a position 5 mm from the core center, $C_{10}$ be the JIS-C hardness at a position 10 mm from the core center and Cs be the JIS-C hardness at the core surface, the value $C_5$–Cs is preferably from 1 to 9, more preferably from 2 to 7, and even more preferably from 3 to 5. Also, the value $C_{10}$–Cc is preferably from 3 to 15, more preferably from 5 to 13, and even more preferably from 7 to 11. In addition, the value Cs–$C_{10}$ is preferably from 13 to 24, more preferably from 15 to 22, and even more preferably from 17 to 20. When these values are smaller or larger than the above specific ranges, the ball spin on full shots may rise, as a result of which the intended distance may not be achieved.

In this invention, it is critical for the following condition to be satisfied in the core hardness profile.

$$(Cs-C_{10})/(C_{10}-Cc)>1.0$$

That is, it is essential for the core to be designed so that the value $(Cs-C_{10})/(C_{10}-Cc)$ is larger than 1.0. This value is preferably at least 1.2, and more preferably at least 1.5. When this value is too small, the spin rate may rise on full shots, as a result of which the intended distance may not be achieved.

The core having the above hardness profile and deflection is preferably made of a material that is composed primarily of rubber. For example, use can be made of a rubber composition obtained by compounding (A) a base rubber as the chief component, (B) an organic peroxide, and also a co-crosslinking agent, an inert filler and, optionally, an organosulfur compound.

Polybutadiene is preferably used as the base rubber (A). The polybutadiene has a cis-1,4 bond content on the polymer chain of typically at least 60 wt %, preferably at least 80 wt %, more preferably at least 90 wt %, and most preferably at least 95 wt %. When the content of cis-1,4 bonds among the bonds on the polybutadiene molecule is too low, the resilience may decrease.

Rubber components other than this polybutadiene may be included in the base rubber (A) within a range that does not detract from the advantageous effects of the invention. Examples of such rubber components other than the foregoing polybutadiene include other polybutadienes and diene rubbers other than polybutadiene, such as styrene-butadiene rubber, natural rubber, isoprene rubber and ethylene-propylene-diene rubber.

The organic peroxide (B) used in the invention is not particularly limited, although the use of an organic peroxide having a one-minute half-life temperature of 110 to 185° C. is preferred. One, two or more organic peroxides may be used. The amount of organic peroxide included per 100 parts by weight of the base rubber is preferably at least 0.1 part by weight, and more preferably at least 0.3 part by weight. The upper limit is preferably not more than 5 parts by weight, more preferably not more than 4 parts by weight, and even more preferably not more than 3 parts by weight. A commercially available product may be used as the organic peroxide. Specific examples include those available under the trade names Percumyl D, Perhexa C-40, Niper BW and Peroyl L (all produced by NOF Corporation), and Luperco 231XL (from Atochem Co.).

The co-crosslinking agent is exemplified by unsaturated carboxylic acids and the metal salts of unsaturated carboxylic acids. Illustrative examples of unsaturated carboxylic acids include acrylic acid, methacrylic acid, maleic acid and fumaric acid. Acrylic acid and methacrylic acid are especially preferred. Metal salts of unsaturated carboxylic acids are not particularly limited, but are exemplified by those obtained by neutralizing the foregoing unsaturated carboxylic acids with the desired metal ions. Illustrative examples include the zinc salts and magnesium salts of methacrylic acid and acrylic acid. The use of zinc acrylate is especially preferred.

These unsaturated carboxylic acids and/or metal salts thereof are included in an amount per 100 parts by weight of the base rubber which is typically at least 10 parts by weight, preferably at least 15 parts by weight, and more preferably at least 20 parts by weight. The upper limit is typically not more than 60 parts by weight, preferably not more than 50 parts by weight, more preferably not more than 45 parts by weight, and most preferably not more than 40 parts by weight. When too much is included, the feel of the ball may become too hard and unpleasant. When too little is included, the rebound may decrease.

The core, to satisfy the desired hardness profile described above, is preferably formed of a material molded under heat from a rubber composition which includes, as the essential ingredients: (A) a base rubber, (B) an organic peroxide, and (C) water and/or a metal monocarboxylate.

Decomposition of the organic peroxide within the core formulation can be promoted by the direct addition of water (or a water-containing material) to the core material. It is known that the decomposition efficiency of the organic peroxide within the core-forming rubber composition changes with temperature and that, starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to the build-up of heat of decomposition by the organic peroxide which has decomposed from the outside, becomes considerably higher than the mold temperature. In cases where water (or a water-containing material) is added directly to the core, because the water acts to promote decomposition of the organic peroxide, radical reactions like those described above can be made to differ at the core center and at the core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and the core surface differ markedly. It is also possible to obtain a core having different dynamic viscoelastic properties at the core center. Along with achieving a lower spin rate, golf balls having such a core are also able to exhibit excellent durability and undergo less change over time in rebound. When zinc monoacrylate is used instead of the above water, water is generated from the zinc monoacrylate by heat during kneading of the compounding materials. An effect similar to that obtained by the addition of water can thereby be obtained.

Components A and B have already been described above.

The water serving as component C is not particularly limited, and may be distilled water or tap water. The use of distilled water which is free of impurities is especially preferred. The amount of water included per 100 parts by weight of the base rubber is preferably at least 0.1 part by weight, and more preferably at least 0.3 part by weight. The upper limit is preferably not more than 5 parts by weight, and more preferably not more than 4 parts by weight.

By including a suitable amount of such water, the moisture content in the rubber composition prior to vulcanization becomes preferably at least 1,000 ppm, and more preferably at least 1,500 ppm. The upper limit is preferably not more than 8,500 ppm, and more preferably not more than 8,000 ppm. When the moisture content of the rubber composition is too low, it may be difficult to obtain a suitable crosslink density and tan δ, which may make it difficult to mold a golf ball having little energy loss and a reduced spin rate. On the other hand, when the moisture content of the rubber composition is too high, the core may end up too soft, which may make it difficult to obtain a suitable core initial velocity.

It is also possible to add water directly to the rubber composition. The following methods (i) to (iii) may be employed to include water:

(i) applying steam or ultrasonically applying water in the form of a mist to some or all of the rubber composition (compounded material);
(ii) immersing some or all of the rubber composition in water;
(iii) letting some or all of the rubber composition stand for a given period of time in a high-humidity environment in a place where the humidity can be controlled, such as a constant humidity chamber.

As used herein, "high-humidity environment" is not particularly limited, so long as it is an environment capable of moistening the rubber composition, although a humidity of from 40 to 100% is preferred.

Alternatively, the water may be worked into a jelly state and added to the above rubber composition. Or a material obtained by first supporting water on a filler, unvulcanized rubber, rubber powder or the like may be added to the rubber composition. In such a form, the workability is better than when water is directly added to the composition, enabling the efficiency of golf ball production to be increased. The type of material in which a given amount of water has been included, although not particularly limited, is exemplified by fillers, unvulcanized rubbers and rubber powders in which sufficient water has been included. The use of a material which causes no loss of durability or resilience is especially preferred. The moisture content of the above material is preferably at least 3 wt %, more preferably at least 5 wt %, and even more preferably at least 10 wt %. The upper limit is preferably not more than 99 wt %, and even more preferably not more than 95 wt %.

In this invention, a metal monocarboxylate may be used instead of the above-described water. Metal monocarboxylates, in which the carboxylic acid is presumably coordination-bonded to the metal, are distinct from metal dicarboxylates such as zinc diacrylate of the formula $(CH_2=CHCOO)_2Zn$. A metal monocarboxylate introduces water into the rubber composition by way of a dehydration/condensation reaction, and thus provides an effect similar to that of water. Moreover, because a metal monocarboxylate can be added to the rubber composition as a powder, the operations can be simplified and uniform dispersion within the rubber composition is easy. In order to carry out the above reaction effectively, a monosalt is required. The amount of metal monocarboxylate included per 100 parts by weight of the base rubber is preferably at least 1 part by weight, and more preferably at least 3 parts by weight. The upper limit in the amount of metal monocarboxylate included is preferably not more than 60 parts by weight, and more preferably not more than 50 parts by weight. When the amount of metal monocarboxylate included is too small, it may be difficult to obtain a suitable crosslink density and tan δ, as a result of which a sufficient golf ball spin rate-lowering effect may not be achievable. On the other hand, when too much is included, the core may become too hard, as a result of which it may be difficult for the ball to maintain a suitable feel at impact.

The carboxylic acid used may be, for example, acrylic acid, methacrylic acid, maleic acid, fumaric acid or stearic acid. Examples of the substituting metal include sodium, potassium, lithium, zinc, copper, magnesium, calcium, cobalt, nickel and lead, although the use of zinc is preferred. Illustrative examples of the metal monocarboxylate include zinc monoacrylate and zinc monomethacrylate, with the use of zinc monoacrylate being especially preferred.

Core production may be carried out in the usual manner by molding a spherical molded article (core) using heat and compression under vulcanization conditions of at least 140° C. and not more than 180° C. and at least 10 minutes and not more than 60 minutes.

The vulcanized core preferably has a higher moisture content at the core center than at the core surface. The moisture content of the molded core can be suitably controlled by adjusting such conditions as the amount of water included in the rubber composition, the molding temperature and the molding time.

The moisture content at the core center, although not particularly limited, is preferably at least 1,000 ppm, more preferably at least 1,200 ppm, and even more preferably at least 1,500 ppm. The upper limit is preferably not more than 7,000 ppm, more preferably not more than 6,000 ppm, and even more preferably not more than 5,000 ppm. The moisture content at the core surface, although not particularly limited, is preferably at least 800 ppm, more preferably at least 1,000 ppm, and even more preferably at least 1,200 ppm. The upper limit is preferably not more than 5,000 ppm, more preferably not more than 4,000 ppm, and even more preferably not more than 3,000 ppm. The (moisture content at core surface)–(moisture content at core center) value is preferably 0 ppm or below, more preferably –100 ppm or below, and even more preferably –200 ppm or below. The lower limit value is preferably –1,000 ppm or above, more preferably –700 ppm or above, and even more preferably –600 ppm or above.

Measurement of the above moisture content may be carried out with ordinary instruments. For example, the moisture content can be measured using the AQ-2100 coulometric Karl Fischer titrator and the EV-2000 evaporator (both available from Hiranuma Sangyo Co. Ltd.) at a measurement temperature of 130° C., a preheating time of 3 minutes and a background measurement time of 30 seconds.

Letting $V_0$ be the initial velocity of the core measured after removing the envelope layer, intermediate layer and cover (which layers are referred to herein collectively as the "core-covering layers") from a ball obtained by molding these core-covering layers over the core and $V_{60}$ be the initial velocity of the core measured 60 days after the day on which $V_0$ was measured, $V_0$ is preferably at least 77.0 m/s, more preferably at least 77.1 m/s, and even more preferably at least 77.2 m/s, but is preferably not more than 78.5 m/s, more preferably not more than 78.3 m/s, and even more preferably not more than 78.0 m/s. $V_{60}$ is preferably at least 77.0 m/s, and more preferably at least 77.1 m/s, but is preferably not more than 77.8 m/s, more preferably not more than 77.7 m/s, and even more preferably not more than 77.6 m/s. When core initial velocities $V_0$ and $V_{60}$ within the above ranges cannot be obtained, achieving a satisfactory distance is difficult. Also, if the core initial velocity is too high, the golf ball may not conform to the Rules of Golf. Because the core-covering layer materials are not readily permeable to moisture in the atmosphere, there are cases where the change in core initial velocity over time cannot be measured using the ball as is or where it takes a long time for such change to occur. Therefore, by removing the core-covering layers and exposing the core itself to the atmosphere, it is possible to reliably measure the change in core initial velocity over time.

The value $V_0-V_{60}$ preferably satisfies the relationship $V_0-V_{60}<0.7$, more preferably satisfies the relationship $V_0-V_{60}<0.6$, and still more preferably satisfies the relationship $V_0-V_{60}<0.5$. In this invention, when moisture has been included in a good balance within the core, even if the core comes directly into contact with the atmosphere, it is not readily influenced by the atmospheric humidity, enabling changes in the core initial velocity to be suppressed.

In this invention, the core initial velocity may be measured using an initial velocity measuring apparatus of the same type as the USGA drum rotation-type initial velocity instrument approved by the R&A. The core may be tested for this purpose in a chamber at a room temperature of 23±2° C. after being held isothermally in a 23±1° C. environment for at least 3 hours.

Next, the method of measuring the dynamic viscoelasticity of the core is explained. In this invention, letting $\tan \delta_1$ be the loss tangent at a dynamic strain of 1% and $\tan \delta_{10}$ be the loss tangent at a dynamic strain of 10% when the loss tangents of the core center and the core surface are measured at a temperature of −12° C. and a frequency of 15 Hz in a dynamic viscoelasticity test on vulcanized rubber at the core center and core surface, and defining the tan δ slope as $(\tan \delta_{10} - \tan \delta_1)/(10\% - 1\%)$, a desirable feature of the invention is that the difference between the tan δ slope at the core surface and the tan δ slope at the core center be larger than 0.002. This difference in slopes is preferably larger than 0.003, and more preferably larger than 0.004. At a smaller difference in slope, the energy loss by the core ends up being larger, making a spin rate-lowering effect more difficult to obtain. Various methods may be employed to measure the dynamic viscoelastic properties of the core. For example, a circular disk having a thickness of 2 mm may be cut out of the cover-encased core by passing through the geometric center thereof and treating this disk as the sample, then using a punching machine to punch out 3 mm diameter specimens at the places of measurement. In addition, by employing a dynamic viscoelasticity measuring apparatus (such as that available under the product name EPLEXOR 500N from GABO) and using a compression test holder, the tan δ values under dynamic strains of 0.01 to 10% can be measured at an initial strain of 35%, a measurement temperature of −12° C. and a frequency of 15 Hz, and the slopes determined based on the results of these measurements.

Regarding the viscoelastic behavior measured in this way, there is known to be a correlation between the viscoelastic behavior in the high-strain region and the spin rate of the golf ball when struck. Thus, when the tan δ in the high-strain region is relatively large, i.e., when the tan δ slope between a dynamic strain of 10% and a dynamic strain of 1% is large, the spin rate rises; conversely, when the tan δ in the high-strain region is relatively small, i.e., when the tan δ slope between a dynamic strain of 10% and a dynamic strain of 1% is small, the spin rate falls. Also, the amount of deformation varies depending on the club used to strike the golf ball, with deformation occurring even at the ball center when the ball is struck with a driver or a middle iron (e.g., a number six iron). Therefore, when striving to reduce the spin rate on shots with a driver or a number six iron, good results can be obtained by making the tan δ slope between a dynamic strain of 10% and a dynamic strain of 1% at the core center small. In cases where the deformation on impact is small, such as on approach shots near the green, the influence of the tan δ at the core surface is large. Hence, to increase or maintain the spin rate on approach shots, good results can be obtained by making the tan δ slope between a dynamic strain of 10% and a dynamic strain of 1% at the core surface large. Accordingly, to obtain a golf ball that travels well on shots with a driver and stops on approach shots, what is desired is for the tan δ slope between a dynamic strain of 10% and a dynamic strain of 1% at the core center to be made small and for the tan δ slope between a dynamic strain of 10% and a dynamic strain of 1% at the core surface to be made large; that is, for the difference between the tan δ slope at the core surface and the tan δ slope at the core center to be made large.

Next, the envelope layer is described.

The envelope layer has a material hardness expressed in terms of Shore D hardness which, although not particularly limited, is preferably from 15 to 40, more preferably from 20 to 35, and even more preferably from 20 to 30. The sphere encased by the envelope layer has a surface hardness, expressed in terms of Shore D hardness, which is preferably from 21 to 46, more preferably from 26 to 41, and even more preferably from 26 to 36. When the envelope layer is too soft, the spin rate on full shots may rise excessively, as a result of which a good distance may not be achieved, and the durability to cracking on repeated impact may worsen. On the other hand, when the envelope layer is too hard, the durability to cracking on repeated impact may worsen, the spin rate on full shots may increase, as a result of which, particularly on shots taken at a low head speed, a good distance may not be achieved, and the feel of the ball may worsen.

The envelope layer has a thickness of preferably from 0.6 to 1.8 mm, more preferably from 0.7 to 1.5 mm, and even more preferably from 0.8 to 1.1 mm. When the envelope layer is too thin, the durability to cracking on repeated impact may worsen and the feel may worsen. On the other hand, when the envelope layer is too thick, the spin rate on full shots may rise, as a result of which a good distance may not be obtained.

The envelope layer material is not particularly limited, although preferred use can be made of ionomer resins, various types of known thermoplastic elastomers such as urethane elastomers, amide elastomers, ester elastomers, olefin elastomers and styrene elastomers, and mixtures thereof. In particular, for easy adjustability within the desired hardness range and to obtain a good rebound resilience, preferred use can be made of a thermoplastic polyether ester elastomer. By using a soft resin material such as a thermoplastic polyether ester elastomer in the envelope layer, a soft feel on full shots can be fully imparted.

Next, the intermediate layer is described.

The intermediate layer has a material hardness expressed in terms of Shore D hardness which, although not particularly limited, is preferably from 40 to 60, more preferably from 45 to 55, and even more preferably from 47 to 53. The sphere encased by the intermediate layer has a surface hardness, expressed in terms of Shore D hardness, which is preferably from 46 to 66, more preferably from 51 to 61, and even more preferably from 53 to 59. When the intermediate layer is too soft, the spin rate on full shots may rise excessively, as a result of which a good distance may not be achieved, and the durability to cracking on repeated impact may worsen. On the other hand, when the intermediate layer is too hard, the durability to cracking on repeated impact may worsen, the spin rate on full shots may increase, as a result of which a good distance may not be achieved, and the feel of the ball may worsen.

The intermediate layer has a thickness of preferably from 0.6 to 1.9 mm, more preferably from 0.8 to 1.6 mm, and even more preferably from 0.9 to 1.2 mm. When the intermediate layer is too thin, the durability to cracking on repeated impact may worsen and the feel may worsen. On the other hand, when the intermediate layer is too thick, the spin rate on full shots may rise, as a result of which a good distance may not be obtained.

The intermediate layer material is not particularly limited, although preferred use can be made of the two following components O and P as the base resins:

(O) An olefin-unsaturated carboxylic acid-unsaturated carboxylic acid ester ternary copolymer, or a metal neutralization product thereof, having a weight-average molecular weight (Mw) of at least 140,000, an acid content of from 10 to 15 wt % and an ester content of at least 15 wt %; and (P) An olefin-acrylic acid binary random copolymer, or a metal neutralization product thereof, having a weight-average molecular weight (Mw) of at least 140,000 and an acid content of from 10 to 15 wt %.

The weight-average molecular weight (Mw) of component O is at least 140,000, and preferably at least 145,000. The weight-average molecular weight (Mw) of component P is at least 140,000, and preferably at least 160,000. By thus making these molecular weights large, the resin material can be assured of having a sufficient resilience.

It is thought that because the acid components and ester contents of the respective copolymers serving as the base resins O and P differ, these two types of base resins interlock in a complex manner, giving rise to molecular synergistic effects that can increase the rebound and durability of the ball. In this invention, by specifying the weight-average molecular weight, acid content and ester content as indicated above in such a way as to select a material that is relatively soft as the base resin O, which is a ternary copolymer, and by specifying the type of acid, weight-average molecular weight and acid content in such a way as to select a relatively hard material as the base resin P, it is possible with a blend of these polymers to ensure a sufficient resilience and durability for use as a golf ball material.

Here, the weight-average molecular weight (Mw) is a value calculated relative to polystyrene in gel permeation chromatography (GPC). A word of explanation is needed here concerning GPC molecular weight measurement. It is not possible to directly take GPC measurements for binary and ternary copolymers because these molecules are adsorbed to the GPC column owing to unsaturated carboxylic acid groups within the molecules. Instead, the unsaturated carboxylic acid groups are generally converted to esters, following which GPC measurement is carried out and the polystyrene-equivalent average molecular weights Mw and Mn are calculated.

The olefin used in component O and component P preferably has 2 to 6 carbons, with ethylene being especially preferred. The unsaturated carboxylic acid used in component O is not particularly limited, although preferred use can be made of acrylic acid or methacrylic acid. To ensure resilience, the unsaturated carboxylic acid used in component P is acrylic acid. This is because, when methacrylic acid is used as the unsaturated carboxylic acid in component P, the methacrylic acid with its pendant methyl group may give rise to a buffering action, lowering the reactivity.

The unsaturated carboxylic acid content (acid content) within each of components O and P, although not particularly limited, is preferably at least 10 wt %, with the upper limit being preferably less than 15 wt %, and more preferably less than 13 wt %. When this acid content is low, moldings of the golf ball material may lack sufficient resilience. On the other hand, when the acid content is high, the hardness may become extremely high, adversely affecting the durability.

The unsaturated carboxylic acid ester used in component O, which is a ternary copolymer, is preferably a lower alkyl ester, with butyl acrylate (butyl n-acrylate, butyl i-acrylate) being especially preferred.

In order to use component O as a resin that is relatively soft compared with the binary copolymer serving as component P, the ester content of the unsaturated carboxylic acid ester in component O is set to at least 15 wt %, preferably at least 18 wt %, and more preferably at least 20 wt %, with the upper limit being preferably not more than 25 wt %. When the ester content is higher than this range, moldings of the intermediate layer material may lack sufficient resilience. On the other hand, when the ester content is low, the hardness may become high, adversely affecting the durability.

The hardness of the base resin O, that is, the hardness when this resin itself is molded alone (material hardness), expressed in terms of Shore D hardness, is preferably at least 30, and more preferably at least 35, with the upper limit being preferably not more than 50, and more preferably not more than 45. The hardness of the base resin P, that is, the hardness when this resin itself is molded alone (material hardness), expressed in terms of Shore D hardness, is preferably at least 40, and more preferably at least 50, with the upper limit being preferably not more than 60, and more preferably not more than 57. When base resins outside of these hardness ranges are used, a material having the desired hardness may not be obtained, or a sufficient resilience and durability may not be obtained.

In this invention, it is preferable for component O and component P to be used together. The mixing proportions of component O and component P, expressed as the weight ratio (O):(P), is set to preferably from 90:10 to 10:90, more preferably from 85:15 to 30:70, and even more preferably from 80:20 to 50:50. When the proportion of component P is larger than this range, the hardness increases, as a result of which molding of the material may be difficult to carry out.

In cases where metal neutralization products of resins (i.e., ionomers) are used as component O and component P, the type of metal neutralization product and the degree of neutralization are not particularly limited. Illustrative examples include 60 mol % Zn (degree of neutralization with zinc) ethylene-methacrylic acid copolymers, 40 mol % Mg (degree of neutralization with magnesium) ethylene-methacrylic acid copolymers, and 40 mol % Mg (degree of neutralization with magnesium) ethylene-methacrylic acid-acrylic acid ester terpolymers.

To ensure at least a given degree of flowability during injection molding and provide a good molding processability, it is essential for the melt flow rates (MFR) of the resins serving as components O and P to each be from 0.5 to 20 g/10 min. The difference between the melt flow rates of components O and P is set to not more than 15 g/10 min. When the difference in melt flow rate between these base resins is too large, the components cannot be uniformly mixed together during the compounding of components O and P in an extruder, and so the mixture becomes non-uniform, which may lead to injection molding defects.

As noted above, copolymers or ionomers with weight-average molecular weights (Mw) set in specific ranges are used as components O and P. Illustrative examples of commercial products that may be used for this purpose include the Nucrel series (DuPont-Mitsui Polychemicals Co., Ltd.), the Escor series (ExxonMobil Chemical), the Surlyn series (E.I. DuPont de Nemours & Co.), and the Himilan series (DuPont-Mitsui Polychemicals Co., Ltd.).

In addition, (Q) a basic inorganic metal compound is preferably included as a component for neutralizing acid groups in above components O and P and subsequently described component R. By even more highly neutralizing the resin material in this way, the spin rate of the ball on full shots is even further reduced without adversely affecting the feel of the ball, thus making an increased distance fully achievable even by amateur golfers. Illustrative examples of the metal ions in the basic inorganic metal compound include $Na^+$, $K^+$, $Li^+$, $Zn^{2+}$, $Ca^{2+}$, $Mg^{2+}$, $Cu^{2+}$ and $Co^{2+}$. Of these, $Na^+$, $Zn^{2+}$, $Ca^{2+}$ and $Mg^{2+}$ are preferred, and $Mg^{2+}$ is more preferred. These metal salts may be introduced into the resin using, for example, formates, acetates, nitrates, carbonates, bicarbonates, oxides and hydroxides.

This basic inorganic metal compound (Q) is included in the resin composition in an amount equivalent to at least 70 mol %, based on the acid groups in the resin composition. Here, the amount in which the basic inorganic metal compound serving as component Q is included may be selected as appropriate for obtaining the desired degree of neutralization. Although this amount depends also on the degree of neutralization of the base resins (components O and P) that are used, in general it is preferably from 1.0 to 2.5 parts by weight, more preferably from 1.1 to 2.3 parts by weight, and even more preferably from 1.2 to 2.0 parts by weight, per 100 parts by weight of the combined amount of the base resins (components O and P). The degree of neutralization of the acid groups in components O to R is preferably at least 70 mol %, more preferably at least 90 mol %, and even more preferably at least 100 mol %.

Next, the anionic surfactant serving as component R is described. The reason for including an anionic surfactant is to improve the durability after resin molding while ensuring good flowability of the overall resin composition. The anionic surfactant is not particularly limited, although the use of one having a molecular weight of from 140 to 1,500 is preferred. Exemplary anionic surfactants include carboxylate surfactants, sulfonate surfactants, sulfate ester surfactants and phosphate ester surfactants. Preferred examples include one, two or more selected from the group consisting of various fatty acids such as stearic acid, behenic acid, oleic acid and maleic acid, derivatives of these fatty acids, and metal salts thereof. Selection from the group consisting of stearic acid, oleic acid and mixtures thereof is especially preferred. Alternatively, exemplary organic acid metal salts that may serve as component R include metal soaps, with the metal salt being one in which a metal ion having a valence of 1 to 3 is used. The metal is preferably selected from the group consisting of lithium, sodium, magnesium, aluminum, potassium, calcium and zinc, with the use of metal salts of stearic acid being especially preferred. Specifically, the use of magnesium stearate, calcium stearate, zinc stearate or sodium stearate is preferred.

Component R is included in an amount, per 100 parts by weight of the base resins serving as components O and P, of from 1 to 100 parts by weight, preferably from 10 to 90 parts by weight, and more preferably from 20 to 80 parts by weight. When the component R content is too low, it may be difficult to lower the hardness of the resin material. On the other hand, at a high content, the resin material is difficult to mold and bleeding at the material surface increases, adversely affecting the molded article.

In this invention, the moldability of the material and the productivity can be further increased by suitably adjusting the compounding ratio between components Q and R. When the content of the basic inorganic metal compound serving as component Q is too high, the amount of gas consisting of organic acids and other substances that evolves during molding decreases, but the flowability of the material diminishes. Conversely, when the content of component Q is low, the amount of gases generated increases. On the other hand, when the content of the anionic surfactant serving as component R is too high, the amount of gas consisting of fatty acids and other organic acids increases during molding, which has a large impact in terms of molding defects and productivity. Conversely, when the content of component R is low, the amount of gases generated decreases, but the flowability and durability decline. Therefore, achieving a proper compounding balance between components Q and R is also important. Specifically, it is desirable to set the compounding ratio between components Q and R, expressed as the weight ratio (Q):(R), to from 4.0:96.0 to 1.0:99.0, and especially from 3.0:97.0 to 1.5:98.5.

The resin composition of above components O to R accounts for preferably at least 50 wt %, more preferably at least 60 wt %, even more preferably at least 70 wt %, and most preferably at least 90 wt %, of the total amount of the intermediate layer material.

A non-ionomeric thermoplastic elastomer may be included in the intermediate layer material. The non-ionomeric thermoplastic elastomer is preferably included in an amount of from 1 to 50 parts by weight per 100 parts by weight of the combined amount of the base resins.

The non-ionomeric thermoplastic elastomer is exemplified by polyolefin elastomers (including polyolefins and metallocene-catalyzed polyolefins), polystyrene elastomers, diene polymers, polyacrylate polymers, polyamide elastomers, polyurethane elastomers, polyester elastomers and polyacetals.

Optional additives may be suitably included in the intermediate layer material according to the intended use. For example, various additives such as pigments, dispersants, antioxidants, ultraviolet absorbers and light stabilizers may be added. When such additives are included, the content thereof per 100 parts by weight of components O to R combined preferably at least 0.1 part by weight, and more preferably at least 0.5 part by weight, with the upper limit being preferably not more than 10 parts by weight, and more preferably not more than 4 parts by weight.

The melt flow rate of the intermediate layer material, as measured in accordance with JIS-K7210 at a test temperature of 190° C. and a test load of 21.18 N (2.16 kgf), is not particularly limited. However, to obtain a good flowability and molding processability during injection molding, it is recommended that this be at least 1.0 g/10 min, preferably at least 1.1 g/10 min, and more preferably at least 1.5 g/10 min, with the upper limit being preferably not more than 4.0 g/10 min, and more preferably not more than 2.7 g/10 min.

Next, the cover (outermost layer) is described.

The cover has a material hardness expressed in terms of Shore D hardness which, although not particularly limited, is preferably more than 60, more preferably from 62 to 70, and even more preferably from 63 to 67. When the cover is too soft, the spin rate on full shots may rise excessively and the rebound may be inadequate, resulting in a decreased distance, or the scuff resistance may worsen. On the other hand, when the cover is too hard, the durability to cracking on repeated impact may worsen and the feel of the ball in the short game or on shots with a putter may worsen.

The cover has a thickness of preferably from 0.7 to 2.0 mm, more preferably from 0.85 to 1.5 mm, and even more preferably from 1.0 to 1.3 mm. When the cover is too thin, the durability to cracking on repeated impact may worsen. On the other hand, when the cover is too thick, the spin rate on shots with a driver (W#1) may become too high, as a result of which a good distance may not be obtained, or the feel of the ball in the short game or on shots with a putter may worsen.

The cover material is not particularly limited, although preferred use can be made of ionomer resins, various types of known thermoplastic elastomers such as urethane elastomers, amide elastomers, ester elastomers, olefin elastomers and styrene elastomers, and mixtures thereof. A cover material composed primarily of an ionomer resin is especially preferred.

The ionomer resin may be of a single type used alone or may be of two or more types used in combination. In this invention, from the standpoint of enhancing rebound, it is especially preferable to use a zinc-neutralized ionomer resin and a sodium-neutralized ionomer resin in combination. In this case, the compounding ratio of zinc-neutralized ionomer resin to sodium-neutralized ionomer resin, expressed as a weight ratio, although not particularly limited, may be set to generally from 20:80 to 80:20, preferably from 30:70 to 70:30, and more preferably from 40:60 to 60:40. Outside of this range in the compounding ratio, the rebound of the ball may be too low, as a result of which the desired flight performance may not be achieved, in addition to which the durability to cracking on repeated impact at normal temperatures may worsen and the durability to cracking at low (subzero) temperatures may also worsen.

A granular inorganic filler is preferably added as a reinforcement to the cover material. The granular inorganic filler used is preferably one having a specific gravity of not more than 5.8. When an inorganic filler having a larger specific gravity than this is used, the cover material may become very heavy, as a result of which the weight of the overall ball may end up exceeding the regulation weight for golf balls. Specific examples of granular inorganic fillers include precipitated barium sulfate, titanium dioxide, calcium carbonate and zinc oxide. One, two or more of these may be used. The average particle size of the granular inorganic filler is preferably from 0.01 to 100 μm, and more preferably from 0.1 to 10 μm. When this average particle size is too much smaller or too much larger than the above range, this may worsen dispersion during filling, as a result of which the specific objects and effects of the invention may not be achieved. The granular inorganic filler is compounded in an amount, per 100 parts by weight of the resin in the cover material, of preferably 5 to 40 parts by weight, more preferably 10 to 30 parts by weight, and even more preferably 15 to 25 parts by weight. When the amount of this granular inorganic filler included is too low, a reinforcing effect may not appear, whereas including too much may adversely affect the dispersibility and even the ball rebound.

The specific gravity of the overall cover, although not particularly limited, is preferably at least 0.97, more preferably from 1.00 to 1.5, and even more preferably from 1.03 to 1.20. When the cover specific gravity is too low, the reinforcing effect may become inadequate and the durability to cracking on repeated impact may worsen. On the other hand, when the cover specific gravity is too high, the rebound may decrease and a good distance may not be achieved.

Multi-piece solid golf balls in which the above-described core, envelope layer, intermediate layer and cover are formed as successive layers may be manufactured by a customary method such as a known injection-molding process.

For example, a multi-piece golf ball may be obtained by placing, as the core, a molded and vulcanized product composed primarily of a rubber material in a given injection mold, injecting an envelope layer material and an intermediate layer material in turn over the core to give an intermediate sphere, and then placing the resulting sphere in another injection mold and injection-molding a cover material over this sphere. Alternatively, the intermediate sphere may be encased by a cover using a method that entails, for example, enclosing the intermediate sphere within two half-cups that have been pre-molded into hemispherical shapes, then molding under applied heat and pressure.

Numerous dimples may be formed on the outside surface of the cover. The number of dimples arranged on the outside surface of the cover, although not particularly limited, is preferably from 280 to 360, more preferably from 300 to 350, and even more preferably from 320 to 340. When the number of dimples is larger than this range, the ball trajectory becomes lower, as a result of which the distance may decrease. On the other hand, when the number of dimples is smaller that this range, the ball trajectory becomes higher, as a result of which an increased distance may not be achieved. The dimple shapes that are used may be of one type or a combination of two or more types selected from among circular shapes, various polygonal shapes, dewdrop shapes and oval shapes. When circular dimples are used, the dimple diameter may be set to from about 2.5 to about 6.5 mm, and the dimple depth may be set to from 0.08 mm to 0.30 mm.

To fully exhibit the aerodynamic properties of the ball, the dimple coverage (SR) on the spherical surface of the golf ball, which is the sum of the individual dimple surface areas, each defined by the flat plane circumscribed by the edge of a dimple, as a percentage of the spherical surface area of the ball were it to have no dimples thereon, is preferably from 60 to 90%. The value $V_0$, defined as the spatial volume of the individual dimples below the flat plane circumscribed by the dimple edge, divided by the volume of the cylinder whose base is the flat plane and whose height is the maximum depth of the dimple from the base, is preferably set to from 0.35 to 0.80 in order to optimize the ball trajectory. The dimple volume occupancy VR, defined as the ratio of the sum of the volumes of the individual dimples, each formed below the flat plane circumscribed by the edge of a dimple, with respect to the volume of the ball were it to have no dimples thereon, is preferably set to from 0.6% to 1.0%. Outside of the ranges for these respective values, the trajectory of the ball may be one that cannot achieve a good distance, as a result of which the distance traveled by the ball may be less than satisfactory.

Hardness Relationship Among Layers

It is critical in this invention for the hardness relationship among the layers to satisfy conditions (I) and (II) below:

(I) ball surface hardness>intermediate layer surface hardness>envelope layer surface hardness<core surface hardness, and (II) (Shore D hardness at core surface−Shore D hardness at envelope layer surface)≥10.

When condition (I) is not satisfied, a good flight performance and a feel that is both soft and solid cannot be achieved by golfers in both the mid and low head-speed ranges. The (Shore D hardness at ball surface−Shore D hardness at intermediate layer surface) value, although not particularly limited, is preferably from 5 to 20, more preferably from 8 to 17, and even more preferably from 10 to 15. When this value is too small, the spin rate-lowering effect on full shots may be inadequate, as a result of which a good distance may not be achieved. On the other hand, when this difference is too large, the durability to cracking on repeated impact may worsen. Also, the (Shore D hardness at intermediate layer surface−Shore D hardness at envelope layer surface) value is preferably from 10 to 50, more preferably from 15 to 35, and even more preferably from 20 to 30. When this value is too small, a feel that is both soft and solid may not be achievable. On the other hand, when this value is too large, the durability to cracking on repeated impact may worsen.

In condition (II) above, the (Shore D hardness at core surface−Shore D hardness at envelope layer surface) value is preferably from 10 to 40, more preferably from 15 to 35, and even more preferably from 20 to 30. When this value is too small, a feel that is both soft and solid may not be achievable. On the other hand, when this value is too large, the spin rate on full shots may rise excessively, as a result of which a good distance may not be obtained.

Thickness Relationship Among Layers

In addition, it is critical in this invention for the hardness relationship among the layers to satisfy conditions (I) and (II) below:

(III) (cover thickness−intermediate layer thickness)>0.05 mm, and (IV) (intermediate layer thickness−envelope layer thickness)>0.05 mm.

In above condition (III), the (cover thickness−intermediate layer thickness) value must be larger than 0.05 mm, and is preferably at least 0.10 mm, and more preferably at least 0.15 mm. In condition (IV), the (intermediate layer thickness−envelope layer thickness) value must be larger than 0.05 mm, and is preferably at least 0.10 mm, and more preferably at least 0.15 mm. When these values fall outside of the above ranges, a spin rate-lowering effect on full shots may not be obtained, as a result of which the intended distance may not be achievable.

In addition, although not particularly limited in this invention, the sum of the thicknesses of the envelope layer, intermediate layer and cover, expressed as the value (cover thickness+intermediate layer thickness+envelope layer thickness), is preferably from 2.7 to 3.7 mm, more preferably from 2.9 to 3.5 mm, and even more preferably from 3.1 to 3.3 mm. When this combined thickness is too small, the durability of the ball to repeated impact may worsen or the feel of the ball at impact may worsen. On the other hand, when this combined thickness is too large, the spin rate on shots with a driver (W#1) may rise, as a result of which the intended distance may not be achieved.

Specific Gravity Relationships Among Layers

Moreover, although not particularly limited in this invention, the specific gravities of the intermediate layer and the cover may be suitably adjusted such that, preferably, (specific gravity of cover) ?(specific gravity of intermediate layer); more preferably, (specific gravity of cover)>(specific gravity of intermediate layer); and even more preferably, (cover specific gravity−intermediate layer specific gravity) 0.05. Outside of this specific gravity relationship, the durability to cracking on repeated impact may worsen, or the rebound may decrease, as a result of which a good distance may not be achieved.

The specific gravities of the core, envelope layer and cover are all generally at least 1.0, preferably at least 1.02, and more preferably at least 1.04. When these specific gravities are smaller than this range, it may not be possible to achieve the intended distance, a good feel and a good durability to cracking all at the same time.

The multi-piece solid golf ball of the invention can be made to conform to the Rules of Golf for play. Specifically, this ball may be formed to a diameter which is such that the ball does not pass through a ring having an inner diameter of 42.672 mm and is not more than 42.80 mm, and to a weight which is from 45.0 to 45.93 g.

EXAMPLES

The following Examples and Comparative Examples are provided to illustrate the invention, and are not intended to limit the scope thereof.

Examples 1 and 2, Comparative Examples 1 to 10

Formation of Core

Cores were produced by preparing core compositions formulated as shown in Table 1 below, then molding and vulcanizing the compositions at 155° C. for 15 minutes.

TABLE 1

| Core formulation | Example | | Comparative Example | | | | | | | | | |
|---|---|---|---|---|---|---|---|---|---|---|---|---|
| (pbw) | 1 | 2 | 1 | 2 | 3 | 4 | 5 | 6 | 7 | 8 | 9 | 10 |
| Polybutadiene A | | | 80 | 80 | 80 | 80 | 80 | 80 | 80 | 80 | | |
| Polybutadiene B | 100 | 100 | 20 | 20 | 20 | 20 | 20 | 20 | 20 | 20 | 100 | 100 |
| Zinc acrylate | 34.5 | 30.5 | 22.3 | 22.3 | 22.3 | 22.3 | 22.3 | 21.0 | 22.3 | 22.3 | 34.5 | 34.5 |
| Organic peroxide (1) | 1.0 | 1.0 | 0.6 | 0.6 | 0.6 | 0.6 | 0.6 | 0.6 | 0.6 | 0.6 | 1.0 | 1.0 |
| Organic peroxide (2) | | | 0.6 | 0.6 | 0.6 | 0.6 | 0.6 | 0.6 | 0.6 | 0.6 | | |
| Water | 1.0 | 1.0 | | | | | | | | | 1.0 | 1.0 |
| Antioxidant | 0.1 | 0.1 | 0.1 | 0.1 | 0.1 | 0.1 | 0.1 | 0.1 | 0.1 | 0.1 | 0.1 | 0.1 |
| Barium sulfate | 17.0 | 18.7 | 19.1 | 15.4 | 21.9 | 20.7 | 19.7 | 21.6 | 24.0 | 21.9 | 17.0 | 17.0 |
| Zinc oxide | 4 | 4 | 4 | 4 | 4 | 4 | 4 | 4 | 4 | 4 | 4 | 4 |
| Zinc salt of pentachlorothiophenol | 0.3 | 0.3 | 0.1 | 0.1 | 0.1 | 0.1 | 0.1 | 0.1 | 0.1 | 0.1 | 0.3 | 0.3 |

Details on the above core materials are given below. Numbers in the table represent parts by weight.

Polybutadiene A: Available under the trade name "BR 01" from JSR Corporation

Polybutadiene B: Available under the trade name "BR 51" from JSR Corporation

Zinc acrylate: Available from Nippon Shokubai Co., Ltd.

Organic Peroxide (1): Dicumyl peroxide, available under the trade name "Percumyl D" from NOF Corporation Organic Peroxide (2): A mixture of 1,1-di(t-butylperoxy)-cyclohexane and silica, available under the trade name "Perhexa C-40" from NOF Corporation Water: Distilled water, from Wako Pure Chemical Industries, Ltd.

Antioxidant: 2,2'-Methylenebis(4-methyl-6-butylphenol), available under the trade name "Nocrac NS-6" from Ouchi Shinko Chemical Industry Co., Ltd.

Barium sulfate: Available under the trade name "Barico #100" from Hakusui Tech Co., Ltd.
Zinc oxide: Available under the trade name "Zinc Oxide Grade 3" from Sakai Chemical Co., Ltd.

Formation of Envelope Layer, Intermediate Layer and Cover

Next, in each example, an envelope layer, an intermediate layer and a cover were successively injection-molded over the resulting core from the resin materials (No. 1 to No. 5) shown in Table 2 below, ultimately giving four-piece solid golf balls.

TABLE 2

| Resin material (pbw) | No. 1 | No. 2 | No. 3 | No. 4 | No. 5 |
|---|---|---|---|---|---|
| Hytrel 3046 | 100 | | | | |
| Hytrel 4767 | | 100 | | | |
| Surlyn 9320 | | | 80 | | |
| AN4221C | | | 20 | | |
| Himilan 1605 | | | | 50 | |
| AM7329 | | | | 50 | |
| AM7327 | | | | | 100 |
| Polyethylene wax | | | | 1 | 1 |
| Precipitated barium sulfate | | | | 20 | 20 |
| Magnesium stearate | | | 80 | 1 | 1 |
| Magnesium oxide | | | 1.4 | | |

Trade names of the chief materials mentioned in the table are given below.
Hytrel: Thermoplastic polyether ester elastomers from DuPont-Toray Co., Ltd.
Surlyn 9320: A metal salt of an ethylene-methacrylic acid-acrylic acid ester ternary copolymer (from E.I. DuPont de Nemours & Co.); weight-average molecular weight (Mw), 164,000; acid content, 10 wt %; ester content, 23 wt %; MFR, 0.8 g/10 min; Shore D hardness, 40
AN4221C: An un-neutralized ethylene-acrylic acid binary copolymer (DuPont-Mitsui Polychemicals Co., Ltd.); weight-average molecular weight (Mw), 181,000; acid content, 12 wt %; MFR, 10 g/10 min; Shore D hardness, 55
Himilan 1605, AM7329, AM7327:
Ionomers available from DuPont-Mitsui Polychemicals Co., Ltd.
Magnesium stearate:
"Magnesium Stearate G" from NOF Corporation
Magnesium oxide:
"Kyowamag MF 150" from Kyowa Chemical Industry Co., Ltd.

Although not shown in the diagram, a common dimple pattern was formed on the cover surface in each ball produced in the Examples of the invention and the Comparative Examples.

For each of the resulting golf balls, properties such as the thicknesses and material hardnesses of the respective layers and the surface hardnesses of various encased spheres were evaluated by the methods described below. The results are shown in Table 3. In addition, the flight performance, feel, and durability to cracking on repeated impact for each golf ball were evaluated as described below. Those results are shown in Table 4.

Core Hardness Profile

The indenter of a durometer was set so as to be substantially perpendicular to the spherical surface of the core, and the core surface hardness in terms of JIS-C hardness was measured as specified in JIS K6301-1975.

To obtain the cross-sectional hardnesses at the center and other specific positions of the core, the core was hemispherically cut so as form a planar cross-section, and measurements were carried out by pressing the indenter of a durometer perpendicularly against the cross-section at the measurement positions. These hardnesses are indicated as JIS-C hardness values.

The Shore D hardness at the core surface was measured with a type D durometer in accordance with ASTM D2240-95.

Dynamic Viscoelastic Properties of Core

A circular disk having a thickness of 2 mm was cut out by passing through the geometric center of the core and, treating the center and surface vicinity of this disk as the respective samples, a punching machine was used to punch out 3 mm diameter specimens at the places of measurement. The loss tangents (tan $\delta$) under dynamic strains of from 0.01% to 10% were measured at an initial strain of 35%, a measurement temperature of −12° C. and a frequency of 15 Hz using a dynamic viscoelasticity measuring apparatus (such as that available under the product name EPLEXOR 500N from GABO) and a compression test holder. Measurement results within a radius of 5 mm from the core center were treated as the core center tan $\delta$, and measurement results within 5 mm of the core surface were treated as the core surface tan $\delta$.

Core Moisture Content

Using the AQ-2100 coulometric Karl Fischer titrator and the EV-2000 evaporator (both available from Hiranuma Sangyo Co., Ltd.), measurement of the moisture content was carried out at a measurement temperature of 130° C., a preheating of 3 minutes and a background measurement time of 30 seconds. The interval time was set to 99 seconds and the current was set to "Fast." Measurement results within a radius of 5 mm from the core center were treated as core center moisture contents, and measurement results within 5 mm of the core surface were treated as core surface moisture contents.

Initial Velocity of Core after Standing

A core was prepared by peeling the core-covering layers from a golf ball. The core initial velocity measured on the day that the core-covering layers—these being the envelope layer, intermediate layer and cover—were peeled off was treated as the Day 0 result, and the initial core velocity when 60 days had elapsed thereafter was treated as the Day 60 result. The core was left to stand in a chamber controlled to a temperature of 24° C. and 40% humidity. The initial velocity was measured using an initial velocity measuring apparatus of the same type as the USGA drum rotation-type initial velocity instrument approved by the R&A. The core was tested in a chamber at a room temperature of 23±2° C. after being held isothermally in a 23±1° C. environment for at least 3 hours. Twenty balls were each hit twice. The time taken for the ball to traverse a distance of 6.28 ft (1.91 m) was measured and used to compute the initial velocity. This cycle was carried out over a period of about 15 minutes.

Core Deflection

A core was placed on a hard plate and the amount of deflection when compressed under a final load of 1,275 N (130 kgf) from an initial load of 98 N (10 kgf) was measured. The amount of deflection here refers in each case to the measured value obtained after holding the test specimen isothermally at 23.9° C.

Diameter of Core, Envelope Layer-Encased Sphere and Intermediate Layer-Encased Sphere The diameters at five random places on the surface were measured at a temperature of 23.9±1° C. and, using the average of these measurements as the measured value for a single core, envelope-encased sphere or intermediate layer-encased sphere, the average diameter for five measured cores, envelope layer-encased spheres and intermediate layer-encased spheres were determined.

Ball Diameter

The diameters at five random dimple-free areas on the surface of a ball were measured at a temperature of 23.9±1° C. and, using the average of these measurements as the measured value for a single ball, the average diameter for five measured balls was determined.

Material Hardnesses of Envelope Layer, Intermediate Layer and Cover (Shore D Hardnesses)

The envelope layer, intermediate layer and cover-forming resin materials were molded into sheets having a thickness of 2 mm and left to stand for at least two weeks, following which the Shore D hardnesses were measured in accordance with ASTM D2240-95.

Surface Hardnesses of Envelope Layer-Encased Sphere, Intermediate Layer-Encased Sphere and Ball (Shore D Hardnesses)

Measurements were taken by pressing the durometer indenter perpendicularly against the surface of the envelope layer-encased sphere, intermediate layer-encased sphere or ball (i.e., the surface of the cover). The surface hardness of the ball (cover) is the measured value obtained at dimple-free places (lands) on the ball surface. The Shore D hardnesses were measured with a type D durometer in accordance with ASTM D2240-95.

Flight Performance on Shots with a Driver

A W#1 club (driver) was mounted on a golf swing robot, and the distance traveled by the ball when struck at a head speed (HS) of 40 m/s was measured. The club was a Tour Stage PHYZ driver (2011 model; loft angle, 11.5°) manufactured by Bridgestone Sports Co., Ltd. The flight performance was rated according to the criteria shown below. The spin rate is the value measured immediately after the ball is struck, as obtained with an apparatus for measuring the initial conditions.

Good: Total distance was 203.0 m or more
NG: Total distance was less than 203.0 m Feel The balls were hit with the same type of W#1 club as above by amateur golfers having head speeds of 35 to 40 m/s, and sensory evaluations were carried out under the following criteria.

Good: Ball had a feel that was both soft and solid
NG: The feel was not sufficiently soft or not sufficiently solid Durability on Repeated Impact The ball was repeatedly hit at a head speed of 35 m/s with the same type of driver (W#1) as above mounted on a golf swing robot. For the ball in each example, a loss of durability was judged to have occurred when the initial velocity of the ball fell to or below 97% of the average initial velocity for the first ten shots. The average value for three measured golf balls (N=3) was used as the basis for evaluation in each example. The durability indexes for the balls in the respective examples were calculated relative to an arbitrary index of 100 for the number of shots taken with the ball in Example 2, and the durability was rated according to the following criteria.

Good: Durability index was 90 or more
NG: Durability index was less than 90

TABLE 3

| | | Example | | Comparative Example | | | |
|---|---|---|---|---|---|---|---|
| | | 1 | 2 | 1 | 2 | 3 | 4 |
| Structure | | 4-piece | 4-piece | 3-piece | 3-piece | 4-piece | 4-piece |
| Core | Diameter (mm) | 36.2 | 36.2 | 38.0 | 38.4 | 36.2 | 36.2 |
| | Weight (g) | 29.4 | 29.4 | 33.5 | 33.9 | 29.4 | 29.2 |
| | Specific gravity | 1.183 | 1.183 | 1.167 | 1.145 | 1.183 | 1.176 |
| | Deflection (mm) | 4.0 | 4.3 | 4.0 | 4.0 | 4.0 | 4.0 |
| | Hardness profile (JIS-C) Surface hardness (Cs) | 84 | 82 | 75 | 75 | 75 | 75 |
| | Hardness 10 mm from center (C10) | 65 | 64 | 68 | 68 | 68 | 68 |
| | Hardness 5 mm from center (C5) | 60 | 59 | 63 | 63 | 63 | 63 |
| | Center hardness (Cc) | 57 | 54 | 58 | 58 | 58 | 58 |
| | Surface − Center (Cs − Cc) | 27 | 28 | 17 | 17 | 17 | 17 |
| | Hardness 5 mm from center (C5) − Center hardness (Cc) | 3 | 5 | 5 | 5 | 5 | 5 |
| | Hardness 10 mm from center (C10) − Center hardness (Cc) | 8 | 10 | 10 | 10 | 10 | 10 |
| | Surface hardness (Cs) − Hardness 10 mm from center (C10) | 19 | 18 | 7 | 7 | 7 | 7 |
| | (Cs − C10)/(C10 − Cc) | 2.3 | 1.8 | 0.7 | 0.7 | 0.7 | 0.7 |
| | Surface hardness (Ds), Shore D | 56 | 54 | 49 | 49 | 49 | 49 |
| tan δ at core center | 0.1% strain | 0.042 | 0.040 | 0.047 | 0.052 | 0.042 | 0.046 |
| | 1% strain | 0.044 | 0.045 | 0.047 | 0.049 | 0.046 | 0.048 |
| | 10% strain | 0.057 | 0.058 | 0.103 | 0.108 | 0.099 | 0.105 |
| | tan δ slope for 10% strain and 1% strain | 0.0014 | 0.0014 | 0.0062 | 0.0066 | 0.0059 | 0.0063 |
| tan δ at core surface | 0.1% strain | 0.076 | 0.069 | 0.070 | 0.074 | 0.073 | 0.070 |
| | 1% strain | 0.079 | 0.075 | 0.072 | 0.075 | 0.073 | 0.076 |
| | 10% strain | 0.140 | 0.138 | 0.138 | 0.140 | 0.136 | 0.140 |
| | tan δ slope for 10% strain and 1% strain | 0.0068 | 0.0070 | 0.0073 | 0.0072 | 0.0070 | 0.0071 |
| Difference in tan δ slopes | | 0.0053 | 0.0056 | 0.0011 | 0.0007 | 0.0011 | 0.0008 |
| Core moisture content | Center (ppm) | 2,163 | 2,102 | 938 | 890 | 957 | 846 |
| | Surface (ppm) | 1,895 | 1,829 | 1,752 | 1,875 | 1,764 | 1,738 |
| | Surface − Center (ppm) | −268 | −273 | 814 | 985 | 807 | 892 |
| Initial velocity of core after standing | Day 0 of standing (V0), m/s | 77.43 | 77.51 | 77.15 | 77.21 | 77.18 | 77.25 |
| | Day 60 of standing (V60), m/s | 77.01 | 77.1 | 76.45 | 76.47 | 76.44 | 76.52 |
| | Initial velocity difference (V0 − V60), m/s | 0.42 | 0.41 | 0.70 | 0.74 | 0.74 | 0.73 |

TABLE 3-continued

| | | | | | | | |
|---|---|---|---|---|---|---|---|
| Envelope layer | Material | No. 1 | No. 1 | — | No. 1 | No. 1 | No. 3 |
| | Thickness (mm) | 0.9 | 0.9 | — | 0.9 | 0.9 | 0.9 |
| | Specific gravity | 1.07 | 1.07 | — | 1.07 | 1.07 | 0.96 |
| | Material hardness (Shore D) | 27 | 27 | — | 27 | 27 | 50 |
| Envelope layer-encased sphere | Diameter (mm) | 38.0 | 38.0 | — | 40.2 | 38.0 | 38.0 |
| | Weight (g) | 33.5 | 33.5 | — | 38.6 | 33.5 | 33.0 |
| | Surface hardness (Es), Shore D | 35 | 35 | — | 35 | 35 | 56 |
| Core surface hardness (Ds) − Envelope layer surface hardness (Es), Shore D | | 21 | 19 | — | 14 | 14 | −7 |
| Intermediate layer | Material | No. 3 | No. 3 | No. 3 | — | No. 3 | No. 1 |
| | Thickness (mm) | 1.1 | 1.1 | 1.1 | — | 1.1 | 1.1 |
| | Specific gravity | 0.96 | 0.96 | 0.96 | — | 0.96 | 1.07 |
| | Material hardness (Shore D) | 50 | 50 | 50 | — | 50 | 27 |
| Intermediate layer-encased sphere | Diameter (mm) | 40.2 | 40.2 | 40.2 | — | 40.2 | 40.2 |
| | Weight (g) | 38.6 | 38.6 | 38.6 | — | 38.6 | 38.6 |
| | Surface hardness (Ms), Shore D | 56 | 56 | 56 | — | 56 | 33 |
| Intermediate layer surface hardness (Ms) − Envelope layer surface hardness (Es), Shore D | | 21 | 21 | — | — | 21 | −23 |
| Cover | Material | No. 4 | No. 4 | No. 4 | No. 4 | No. 5 | No. 4 |
| | Thickness (mm) | 1.25 | 1.25 | 1.25 | 1.25 | 1.25 | 1.25 |
| | Specific gravity | 1.05 | 1.05 | 1.05 | 1.05 | 1.05 | 1.05 |
| | Material hardness (shore D) | 63 | 63 | 63 | 63 | 48 | 63 |
| Ball | Diameter (mm) | 42.7 | 42.7 | 42.7 | 42.7 | 42.7 | 42.7 |
| | Weight (g) | 45.5 | 45.5 | 45.5 | 45.5 | 45.5 | 45.5 |
| | Surface hardness (Bs), Shore D | 69 | 69 | 69 | 69 | 54 | 69 |
| Cover thickness + Intermediate layer thickness + Envelope layer thickness (mm) | | 3.25 | 3.25 | 2.35 | 2.15 | 3.25 | 3.25 |
| Core diameter/Cover thickness | | 29.0 | 29.0 | 30.4 | 30.7 | 29.0 | 29.0 |
| Core diameter/Intermediate layer thickness | | 32.9 | 32.9 | 34.5 | — | 32.9 | 32.9 |
| Core diameter/Envelope layer thickness | | 40.2 | 40.2 | — | 42.7 | 40.2 | 40.2 |
| Cover specific gravity − Intermediate layer specific gravity | | 0.09 | 0.09 | 0.09 | — | 0.09 | −0.02 |
| Ball surface hardness (Bs) − Intermediate layer surface hardness (Es), Shore D | | 13 | 13 | 13 | 34 | −2 | 36 |

| | | Comparative Example | | | | | |
|---|---|---|---|---|---|---|---|
| | | 5 | 6 | 7 | 8 | 9 | 10 |
| Structure | | 4-piece | 4-piece | 4-piece | 4-piece | 4-piece | 4-piece |
| Core | Diameter (mm) | 36.2 | 36.7 | 35.0 | 36.2 | 36.2 | 36.2 |
| | Weight (g) | 29.1 | 30.5 | 26.8 | 29.4 | 29.4 | 29.2 |
| | Specific gravity | 1.17 | 1.178 | 1.195 | 1.183 | 1.183 | 1.176 |
| | Deflection (mm) | 4.0 | 4.3 | 4.0 | 4.0 | 4.0 | 4.0 |
| | Hardness profile (JIS-C) Surface hardness (Cs) | 75 | 72 | 75 | 75 | 84 | 84 |
| | Hardness 10 mm from center (C10) | 68 | 66 | 68 | 68 | 65 | 65 |
| | Hardness 5 mm from center (C5) | 63 | 59 | 63 | 63 | 60 | 60 |
| | Center hardness (Cc) | 58 | 57 | 58 | 58 | 57 | 57 |
| | Surface − Center (Cs − Cc) | 17 | 15 | 17 | 17 | 27 | 27 |
| | Hardness 5 mm from center (C5) − Center hardness (Cc) | 5 | 2 | 5 | 5 | 3 | 3 |
| | Hardness 10 mm from center (C10) − Center hardness (Cc) | 10 | 9 | 10 | 10 | 8 | 8 |
| | Surface hardness (Cs) − Hardness 10 mm from center (C10) | 7 | 6 | 7 | 7 | 19 | 19 |
| | (Cs − C10)/(C10 − Cc) | 0.7 | 0.7 | 0.7 | 0.7 | 2.3 | 2.3 |
| | Surface hardness (Ds), Shore D | 49 | 47 | 49 | 49 | 56 | 56 |
| tan δ at core center | 0.1% strain | 0.045 | 0.043 | 0.040 | 0.046 | 0.042 | 0.042 |
| | 1% strain | 0.046 | 0.047 | 0.043 | 0.049 | 0.044 | 0.044 |
| | 10% strain | 0.114 | 0.105 | 0.095 | 0.103 | 0.057 | 0.057 |
| | tan δ slope for 10% strain and 1% strain | 0.0076 | 0.0064 | 0.0058 | 0.0060 | 0.0014 | 0.0014 |
| tan δ at core surface | 0.1% strain | 0.069 | 0.066 | 0.075 | 0.071 | 0.076 | 0.076 |
| | 1% strain | 0.073 | 0.070 | 0.075 | 0.072 | 0.079 | 0.079 |
| | 10% strain | 0.148 | 0.134 | 0.133 | 0.134 | 0.140 | 0.140 |
| | tan δ slope for 10% strain and 1% strain | 0.0083 | 0.0071 | 0.0064 | 0.0069 | 0.0068 | 0.0068 |
| Difference in tan δ slopes | | 0.0008 | 0.0007 | 0.0007 | 0.0009 | 0.0053 | 0.0053 |
| Core moisture content | Center (ppm) | 989 | 903 | 921 | 859 | 2,163 | 2,163 |
| | Surface (ppm) | 1,852 | 1,710 | 1,755 | 1,789 | 1,895 | 1,895 |
| | Surface − Center (ppm) | 863 | 807 | 834 | 930 | −268 | −268 |
| Initial velocity of core after standing | Day 0 of standing (V0), m/s | 77.22 | 77.07 | 77.23 | 77.17 | 77.43 | 77.43 |
| | Day 60 of standing (V60), m/s | 76.47 | 76.37 | 76.49 | 76.43 | 77.01 | 77.01 |
| | Initial velocity difference (V0 − V60), m/s | 0.75 | 0.70 | 0.74 | 0.74 | 0.42 | 0.42 |

TABLE 3-continued

| | | | | | | | |
|---|---|---|---|---|---|---|---|
| Envelope layer | Material | No. 2 | No. 1 | No. 1 | No. 1 | No. 1 | No. 3 |
| | Thickness (mm) | 0.9 | 0.9 | 1.5 | 0.9 | 0.9 | 0.9 |
| | Specific gravity | 1.15 | 1.07 | 1.07 | 1.07 | 1.07 | 0.96 |
| | Material hardness (Shore D) | 47 | 27 | 27 | 27 | 27 | 50 |
| Envelope layer-encased sphere | Diameter (mm) | 38.0 | 38.5 | 38.0 | 38.0 | 38.0 | 38.0 |
| | Weight (g) | 33.5 | 34.8 | 33.5 | 33.5 | 33.5 | 33.0 |
| | Surface hardness (Es), Shore D | 53 | 35 | 35 | 35 | 35 | 56 |
| Core surface hardness (Ds) – Envelope layer surface hardness (Es), Shore D | | −4 | 12 | 14 | 14 | 21 | 0 |
| Intermediate layer | Material | No. 3 | No. 3 | No. 3 | No. 3 | No. 3 | No. 1 |
| | Thickness (mm) | 1.1 | 1.1 | 1.1 | 1.1 | 1.1 | 1.1 |
| | Specific gravity | 0.96 | 0.96 | 0.96 | 0.96 | 0.96 | 1.07 |
| | Material hardness (Shore D) | 50 | 50 | 50 | 50 | 50 | 27 |
| Intermediate layer-encased sphere | Diameter (mm) | 40.2 | 40.7 | 40.2 | 40.2 | 40.2 | 40.2 |
| | Weight (g) | 38.6 | 40 | 38.6 | 38.6 | 38.6 | 38.6 |
| | Surface hardness (Ms), Shore D | 56 | 56 | 56 | 56 | 56 | 33 |
| Intermediate layer surface hardness (Ms) – Envelope layer surface hardness (Es), Shore D | | 3 | 21 | 21 | 21 | 21 | −23 |
| Cover | Material | No. 4 | No. 4 | No. 4 | No. 4 | No. 5 | No. 4 |
| | Thickness (mm) | 1.25 | 1.00 | 1.25 | 1.25 | 1.25 | 1.25 |
| | Specific gravity | 1.05 | 1.05 | 1.05 | 1.05 | 1.05 | 1.05 |
| | Material hardness (shore D) | 63 | 63 | 63 | 63 | 48 | 63 |
| Ball | Diameter (mm) | 42.7 | 42.7 | 42.7 | 42.7 | 42.7 | 42.7 |
| | Weight (g) | 45.5 | 45.5 | 45.5 | 45.5 | 45.5 | 45.5 |
| | Surface hardness (Bs), Shore D | 69 | 69 | 69 | 69 | 54 | 69 |
| Cover thickness + Intermediate layer thickness + Envelope layer thickness (mm) | | 3.25 | 3.00 | 3.85 | 3.25 | 3.25 | 3.25 |
| Core diameter/Cover thickness | | 29.0 | 36.7 | 28.0 | 29.0 | 29.0 | 29.0 |
| Core diameter/Intermediate layer thickness | | 32.9 | 33.4 | 31.8 | 32.9 | 32.9 | 32.9 |
| Core diameter/Envelope layer thickness | | 40.2 | 40.8 | 23.3 | 40.2 | 40.2 | 40.2 |
| Cover specific gravity – Intermediate layer specific gravity | | 0.09 | 0.09 | 0.09 | 0.09 | 0.09 | −0.02 |
| Ball surface hardness (Bs) – Intermediate layer surface hardness (Es), Shore D | | 13 | 13 | 13 | 13 | −2 | 36 |

TABLE 4

| | | | Example | | Comparative Example | | | | | | | | | |
|---|---|---|---|---|---|---|---|---|---|---|---|---|---|---|
| | | | 1 | 2 | 1 | 2 | 3 | 4 | 5 | 6 | 7 | 8 | 9 | 10 |
| Flight | W# 140 m/s | Spin rate (rpm) | 2,935 | 2,865 | 3,003 | 3,070 | 3,195 | 3,059 | 3,036 | 3,015 | 3,048 | 3,005 | 3,135 | 2,999 |
| | | Total distance (m) | 204.5 | 204.1 | 202.9 | 202 | 201.4 | 202.3 | 202.8 | 202.9 | 202.5 | 202.6 | 201.9 | 202.7 |
| | | Rating | good | good | NG | NG | NG | NG | NG | NG | NG | NG | NG | NG |
| Feel | | | good | good | NG | good | good | good | NG | good | good | good | good | good |
| Durability on repeated impact | | Rating | good | good | good | good | good | good | good | NG | good | good | good | good |

As shown by the results in Table 4, the golf balls of Comparative Examples 1 to 10 were inferior to the inventive golf balls (Examples 1 and 2) in the following respects.

The ball in Comparative Example 1 was a three-piece solid golf ball without an envelope layer, and had a poor feel.

The ball in Comparative Example 2 was a three-piece solid golf ball without an intermediate layer, and traveled a shorter than desirable distance on shots with a driver (W#1).

The ball in Comparative Example 3 was a golf ball having a ball surface hardness that was lower than the surface hardness of the intermediate layer, and traveled a shorter than desirable distance on shots with a driver (W#1).

The ball in Comparative Example 4 was a golf ball in which the intermediate layer was softer than the envelope layer, and traveled a shorter than desirable distance on shots with a driver (W#1).

The ball in Comparative Example 5 was a golf ball in which the (Shore D hardness at core surface–Shore D hardness at envelope layer surface) value was less than 10, and did not have a good feel.

The ball in Comparative Example 6 was a golf ball having a small cover thickness, and had a poor durability to cracking on repeated impact.

The ball in Comparative Example 7 was a golf ball having a thick envelope layer, and traveled a shorter than desirable distance on shots with a driver (W#1).

The ball in Comparative Example 8 lacked a suitable core hardness profile, and therefore traveled a shorter than desirable distance on shots with a driver (W#1).

The ball in Comparative Example 9 was a golf ball in which the ball surface hardness was lower than the surface hardness of the intermediate layer, and which traveled a shorter than desirable distance on shots with a driver (W#1).

The ball in Comparative Example 10 was a golf ball in which the intermediate layer was softer than the envelope layer, and which traveled a shorter than desirable distance on shots with a driver (W#1).

Japanese Patent Application No. 2015-061054 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a core, an envelope layer encasing the core, an intermediate layer encasing the envelope layer, and a cover encasing the intermediate layer, wherein the following conditions are satisfied:
   (I) ball surface hardness>intermediate layer surface hardness>envelope layer surface hardness<core surface hardness,
   (II) (Shore D hardness at core surface−Shore D hardness at envelope layer surface)≥10,
   (III) (cover thickness−intermediate layer thickness)>0.05 mm,
   (IV) (intermediate layer thickness−envelope layer thickness)>0.05 mm, and
   (V) $(Cs-C_{10})/(C_{10}-Cc)>1.0$,
Cs in condition (V) denoting the JIS-C hardness at the core surface, $C_{10}$ denoting the JIS-C hardness at a position 10 mm from a center of the core, and Cc denoting the JIS-C hardness at the core center, and wherein $V_0-V_{60}<0.7$, where $V_0$ is the initial velocity of the core in the golf ball after the envelope layer, intermediate layer and cover, collectively referred to herein as "the core-covering layers," have been molded, as measured after peeling away the core-covering layers, and $V_{60}$ is the core initial velocity measured 60 days after measuring $V_0$.

2. The golf ball of claim 1 which further satisfies the following condition:
   (VI) (JIS-C hardness at core surface−JIS-C hardness at core center)≥21.

3. The golf ball of claim 1, wherein the core has a diameter in the range of 35.3 to 37.3 mm, which ball further satisfies the following condition:
   (VII) 2.7 mm≤(cover thickness+intermediate layer thickness+envelope layer thickness)≤3.7 mm.

4. The golf ball of claim 1 which further satisfies the following condition:
   (VIII) 10≤(Shore D hardness at intermediate layer surface−Shore D hardness at envelope layer surface)≤50.

5. The golf ball of claim 1 which further satisfies the following condition:
   (IX) 5≤(Shore D hardness at ball surface−Shore D hardness at intermediate layer surface)≤20.

6. The golf ball of claim 1 which further satisfies the following condition:
   (X) specific gravity of cover≥specific gravity of intermediate layer.

7. The golf ball of claim 1, wherein the envelope layer is formed of a resin material composed primarily of a thermoplastic polyether ester elastomer.

8. The golf ball of claim 1, wherein the core is formed of a material molded under heat from a rubber composition comprising:
   (A) a base rubber,
   (B) an organic peroxide, and
   (C) water or a metal monocarboxylate or both.

9. The golf ball of claim 1 wherein, letting tan $\delta_1$ be the loss tangent at a dynamic strain of 1% and tan $\delta_{10}$ be the loss tangent at a dynamic strain of 10% when the loss tangents of the core center and the core surface are measured at a temperature of −12° C. and a frequency of 15 Hz, and defining the tan δ slope as (tan $\delta_{10}$−tan $\delta_1$)/(10%−1%), the difference between the tan δ slope at the core surface and the tan δ slope at the core center is larger than 0.002.

10. The golf ball of claim 1, wherein the intermediate layer is formed of a resin composition comprising:
   a combined amount of 100 parts by weight of the following two base resins O and P:
      (O) an olefin-unsaturated carboxylic acid-unsaturated carboxylic acid ester ternary copolymer, or a metal neutralization product thereof, having a weight-average molecular weight (Mw) of at least 140,000, an acid content of from 10 to 15 wt % and an ester content of at least 15 wt %, and
      (P) an olefin-acrylic acid binary random copolymer, or a metal neutralization product thereof, having a weight-average molecular weight (Mw) of at least 140,000 and an acid content of from 10 to 15 wt % blended in a weight ratio (O):(P) of from 90:10 to 10:90;
   (Q) from 1.0 to 2.5 parts by weight of a basic inorganic metal compound capable of neutralizing un-neutralized acid groups in the resin composition; and
   (R) from 1 to 100 parts by weight of an anionic surfactant having a molecular weight of from 140 to 1500,
   and wherein the component O and P resins each have a melt flow rate of from 0.5 to 20 g/10 min, component O and component P have a melt flow rate difference therebetween of not more than 15 g/10 min, the composition comprising components O to R has a melt flow rate of at least 1.0 g/10 min, and a molded material obtained by molding the composition under applied heat has a Shore D hardness of from 35 to 60.

11. The golf ball of claim 1 wherein the condition (V) is satisfied below:

$(V)(Cs-C_{10})/(C_{10}-Cc)>1.8$.

12. A multi-piece solid golf ball comprising a core, an envelope layer encasing the core, an intermediate layer encasing the envelope layer, and a cover encasing the intermediate layer, wherein the following conditions are satisfied:
   (I) ball surface hardness >intermediate layer surface hardness >envelope layer surface hardness <core surface hardness,
   (II) (Shore D hardness at core surface −Shore D hardness at envelope layer surface)>10,
   (III) (cover thickness−intermediate layer thickness)>0.05 mm,
   (IV) (intermediate layer thickness−envelope layer thickness)>0.05 mm, and
   (V) $(Cs-C_{10})/(C_{10}-Cc)>1.0$,
   Cs in condition (V) denoting the JIS-C hardness at the core surface, $C_{10}$ denoting the JIS-C hardness at a position 10 mm from a center of the core, and Cc denoting the JIS-C hardness at the core center, and wherein, letting tan $\delta_1$ be the loss tangent at a dynamic strain of 1% and tan $\delta_{10}$ be the loss tangent at a dynamic strain of 10% when the loss tangents of the core center and the core surface are measured at a temperature of −12° C. and a frequency of 15 Hz, and defining the tan δ slope as (tan $\delta_{10}$−tan δ)/(10%−1%), the difference between the tan δ slope at the core surface and the tan δ slope at the core center is larger than 0.002.

13. The golf ball of claim 12, which further satisfies the following condition:
(VI) (JIS-C hardness at core surface −JIS-C hardness at core center)>21.

14. The golf ball of claim 12, wherein the core has a diameter in the range of 35.3 to 37.3 mm, which ball further satisfies the following condition:
(VII) 2.7 mm<(cover thickness+intermediate layer thickness+envelope layer thickness)<3.7 mm.

15. The golf ball of claim 12, which further satisfies the following conditions:
(VIII) 10<(Shore D hardness at intermediate layer surface−Shore D hardness at envelope layer surface)<50,
(IX) 5<(Shore D hardness at ball surface−Shore D hardness at intermediate layer surface)<20.

16. A multi-piece solid golf ball comprising a core, an envelope layer encasing the core, an intermediate layer encasing the envelope layer, and a cover encasing the intermediate layer, wherein the following conditions are satisfied:
(I) ball surface hardness>intermediate layer surface hardness>envelope layer surface hardness<core surface hardness,
(II) (Shore D hardness at core surface−Shore D hardness at envelope layer surface)>10,
(III) (cover thickness−intermediate layer thickness)>0.05 mm,
(IV) (intermediate layer thickness−envelope layer thickness)>0.05 mm, and
(V) (Cs−$C_{10}$)/($C_{10}$−Cc)>1.0,
Cs in condition (V) denoting the JIS-C hardness at the core surface, $C_{10}$ denoting the JIS-C hardness at a position 10 mm from a center of the core, and Cc denoting the JIS-C hardness at the core center, and wherein the intermediate layer is formed of a resin composition comprising:
a combined amount of 100 parts by weight of the following two base resins O and P:
(O) an olefin-unsaturated carboxylic acid-unsaturated carboxylic acid ester ternary copolymer, or a metal neutralization product thereof, having a weight-average molecular weight (Mw) of at least 140,000, an acid content of from 10 to 15 wt % and an ester content of at least 15 wt %, and
(P) an olefin-acrylic acid binary random copolymer, or a metal neutralization product thereof, having a weight-average molecular weight (Mw) of at least 140,000 and an acid content of from 10 to 15 wt %
blended in a weight ratio (O):(P) of from 90:10 to 10:90;
(Q) from 1.0 to 2.5 parts by weight of a basic inorganic metal compound capable of neutralizing un-neutralized acid groups in the resin composition; and
(R) from 1 to 100 parts by weight of an anionic surfactant having a molecular weight of from 140 to 1500,
and wherein the component O and P resins each have a melt flow rate of from 0.5 to 20 g/10 min, component O and component P have a melt flow rate difference therebetween of not more than 15 g/10 min, the composition comprising components O to R has a melt flow rate of at least 1.0 g/10 min, and a molded material obtained by molding the composition under applied heat has a Shore D hardness of from 35 to 60.

17. The golf ball of claim 16, which further satisfies the following condition:
(VI) (JIS-C hardness at core surface −JIS-C hardness at core center)>21.

18. The golf ball of claim 16, wherein the core has a diameter in the range of 35.3 to 37.3 mm, which ball further satisfies the following condition:
(VII) 2.7 mm<(cover thickness+intermediate layer thickness+envelope layer thickness)<3.7 mm.

19. The golf ball of claim 16, which further satisfies the following conditions:
(VIII) 10<(Shore D hardness at intermediate layer surface−Shore D hardness at envelope layer surface)<50,
(IX) 5<(Shore D hardness at ball surface−Shore D hardness at intermediate layer surface)<20.

* * * * *